(12) United States Patent
Hiruma et al.

(10) Patent No.: US 8,137,773 B2
(45) Date of Patent: Mar. 20, 2012

(54) POLYOLEFIN SERIES HEAT-SHRINKABLE FILM, MOLDED PRODUCT AND HEAT-SHRINKABLE LAMINATED LABEL EMPLOYING THE FILM, AND CONTAINER

(75) Inventors: Takashi Hiruma, Shiga (JP); Takeyoshi Yamada, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 220 days.

(21) Appl. No.: 12/095,069

(22) PCT Filed: Nov. 30, 2006

(86) PCT No.: PCT/JP2006/324020
§ 371 (c)(1),
(2), (4) Date: Aug. 12, 2008

(87) PCT Pub. No.: WO2007/063973
PCT Pub. Date: Jun. 7, 2007

(65) Prior Publication Data
US 2008/0311320 A1 Dec. 18, 2008

(30) Foreign Application Priority Data
Nov. 30, 2005 (JP) ................................ 2005-344981

(51) Int. Cl.
*B65B 53/02* (2006.01)
*B32B 27/08* (2006.01)
*B32B 27/36* (2006.01)
*C08L 25/02* (2006.01)

(52) U.S. Cl. ....... 428/34.9; 428/35.7; 428/483; 525/241

(58) Field of Classification Search ............... 428/34.9, 428/35.7, 35.9, 36.7, 483, 516; 53/442; 206/497; 525/241
See application file for complete search history.

(56) References Cited

U.S. PATENT DOCUMENTS

| | | | |
|---|---|---|---|
| 5,023,143 A * | 6/1991 | Nelson ........................... | 428/516 |
| 5,225,490 A * | 7/1993 | Tokiwa et al. ................. | 525/176 |
| 5,512,333 A * | 4/1996 | Suskind ......................... | 427/536 |
| 5,536,807 A * | 7/1996 | Gruber et al. .................. | 528/354 |
| 5,952,088 A | 9/1999 | Tsai et al. | |
| 6,855,406 B2 | 2/2005 | Takayasu et al. | |
| 6,960,374 B1 * | 11/2005 | Terada et al. ................. | 428/35.7 |
| 2003/0039775 A1 * | 2/2003 | Kong ............................ | 428/34.9 |
| 2009/0022916 A1 | 1/2009 | Yamada et al. | |
| 2009/0202758 A1 | 8/2009 | Hiruma et al. | |
| 2009/0263600 A1 | 10/2009 | Miyashita et al. | |
| 2010/0143623 A1 | 6/2010 | Hiruma et al. | |

FOREIGN PATENT DOCUMENTS

| | | |
|---|---|---|
| CN | 1247552 A | 3/2000 |
| CN | 1442445 A | 9/2003 |
| EP | 1 839 849 A1 | 10/2007 |
| JP | 57-003841 | 1/1982 |
| JP | 60-203653 | 10/1985 |
| JP | 63-214446 | 9/1988 |
| JP | 05-179110 | 7/1993 |
| JP | 06-263892 | 9/1994 |
| JP | 09-316310 | 12/1997 |
| JP | 2002-019053 | 1/2002 |
| JP | 2002-194109 | 7/2002 |
| JP | 2002-273839 | 9/2002 |
| JP | 2003-205548 | 7/2003 |
| JP | 2003-301077 | * 10/2003 |
| JP | 2003-306587 | 10/2003 |
| JP | 2005-068232 | 3/2005 |
| JP | 2005-232228 | 9/2005 |
| JP | 2005-306587 | 11/2005 |
| JP | 2005-307128 | 11/2005 |
| WO | 03/055937 | 7/2003 |

OTHER PUBLICATIONS

Machine Translation of JP 2002-019053. Jan. 2002.*
Machine Translation of JP 2003-301077. Oct. 2003.*
Supplementary European Search Report dated Dec. 5, 2011, issued in the corresponding European Patent Application No. 06833823.5-2124, filed Nov. 30, 2006.

* cited by examiner

*Primary Examiner* — Rena Dye
*Assistant Examiner* — Erik Kashnikow
(74) *Attorney, Agent, or Firm* — Oblon, Spivak, McClelland, Maier & Neustadt, L.L.P.

(57) ABSTRACT

The present invention provides a polyolefin series heat-shrinkable film comprising a mixed resin mainly containing a polyolefin series resin (A), polylactic acid series resin (B), and a resin (C) facilitating compatibility with the resin (A) and the resin (B), or comprising at least one layer made of the mixed resin, wherein mass ratio of the resin (A) to the resin (B) is (A)/(B)=99/1 to 70/30; heat shrinkage ratio of the film at least in one direction when dipped in hot water at 80° C. for 10 seconds is 20% or more; and natural shrinkage ratio of the film when stored at 40° C. under 50% RH environment for 7 days is less than 10%. This polyolefin series heat-shrinkable film exhibits excellent heat-shrinkable property and shrink finishing quality, and inhibits natural shrinkage. This invention also provides a polyolefin series heat-shrinkable label and container on which the heat-shrinkable label is fitted.

11 Claims, No Drawings

POLYOLEFIN SERIES HEAT-SHRINKABLE FILM, MOLDED PRODUCT AND HEAT-SHRINKABLE LAMINATED LABEL EMPLOYING THE FILM, AND CONTAINER

CROSS-REFERENCE TO PRIOR APPLICATIONS

This is a U.S. national phase application under 35 U.S.C. §371 of International Patent Application No. PCT/JP2006/324020, filed Nov. 30, 2006, and claims the benefit of Japanese Application No. 2005-344981, filed Nov. 30, 2005, both of which are incorporated by reference herein. The International Application was published in Japanese on Jun. 7, 2007 as International Publication No. WO 2007/063973 A1 under PCT Article 21(2).

TECHNICAL FIELD

The present invention relates to a polyolefin series heat-shrinkable film, a molded product and a heat-shrinkable label employing the film, and a container. More particularly, the present invention relates to a polyolefin series heat-shrinkable film, which exhibits excellent heat-shrinkable property and shrink finishing quality, and low natural shrinkage, and which is applicable to shrinkable packing, shrinkable bond-packing, shrinkable label, and the like; the invention also relates to a molded product and a heat-shrinkable label employing the film, and a container on which the molded product or the heat-shrinkable label is fitted.

BACKGROUND ART

These days, soft drinks such as juice and also alcoholic beverages such as beer are sold in a form that the drink is filled in containers like glass bottles or PET (polyethylene terephthalate) bottles. When the drinks are on sale, in order to differentiate the goods from other goods and to improve its visibility, a heat-shrinkable label on which printing is given is provided onto the outside of each container. As a material for this heat-shrinkable label, polyvinyl chloride, polyester, polystyrene, polyolefin, and so on are usually used.

Since the polyester series heat-shrinkable film exhibits excellent film rigidity (stiffness) at room temperature, shrinkage property in low temperature, and natural shrinkage; these are suitably used for the above applications. However, compared with a polyvinyl chloride series heat-shrinkable film, the polyester series heat-shrinkable film has problems that shrinkage spots and wrinkles tend to occur at a time of heat-shrinking.

In addition, a polyolefin series heat-shrinkable film including a polypropylene resin and a polyethylene resin as main materials has also been developed. Nevertheless, although the polyolefin series heat-shrinkable film inhibits the occurrence of shrinkage spots and wrinkles compared with polyester series film, sufficient low-temperature heat-shrinkable property cannot be obtained. Therefore, insufficient shrinkage makes it impossible to correspond to the diversifying shape of PET bottles these days. Further, in the polyolefin series heat-shrinkable film, compared with a polyester series film, natural shrinkage is high. So, shrinkage gradually proceeds in storage warehouse at room temperature and in summer season and film dimensions change; or if the film is rolled, deformation and so on cause troubles at a time of packaging using the film and secondary fabrication.

To the above problem, Patent Documents 1 and 2 disclose a film obtained by elongating a mixed resin containing a specific random polypropylene resin and a hydrocarbon resin. However, according to the present inventors, although the heat-shrinkable property is more or less improved, it is still insufficient; further, problem that natural shrinkage is large is not solved.

On the other hand, a mixed resin composition consisting of a polylactic acid series resin and a modified polyolefin resin, for a compatibility of improvement in mechanical property represented by impact strength and maintenance of biodegradability as a main purpose, is commonly known (refer to Patent Documents 3 to 5). However, this resin composition is the one where matrix is made into a biodegradable resin, even if the purpose and effects are considered, it is difficult to obtain necessary heat-shrinkable property, shrink finishing quality, elongation property, and so on for the heat-shrinkable film.

Moreover, Patent Document 6 discloses a resin composition including a polyolefin series resin as a main component and further containing polylactic acid series resin and vinyl acetate-ethylene copolymer, acrylic modified poly-tetrafluoroethylene, or a polystyrene series copolymer. However, this resin composition is mainly aimed at inhibiting fouling at a time of roll forming and maintenance of biodegradability; if it is applied to the heat-shrinkable film production, there are problems in lack of heat-shrinkable property, shrink finishing quality, and elongation property.

In addition, Patent Document 7 discloses a microbial disintegrative thermoplastic resin film, wherein a graft polymer having a comb structure which exhibits compatibility to both acidly modified or epoxy modified functional group and polyolefin series resin is distributed to a mixed resin consisting of a polyolefin series resin and a microbial-degradable thermoplastic resin. Nevertheless, this film is aimed at improving microbial disintegrative property and heat-sealing, and is used for bag-like product requiring heat-sealing. Thus, it cannot be applicable for a heat-shrinkable film which does not require heat-sealing but require heat-shrinkable property, shrink finishing quality, and so on.

Furthermore, Patent Document 8 discloses a shrinkable sheet comprising a layer having a polyolefin series resin as a main component and another layer having a polylactic acid as a main component. However, this sheet is developed for the purpose of producing a film for shrinkable packing for lunch boxes, prepared food, and the like sold in convenience stores and so on; and it just attempts a formation of shrinkable sheet by inflation molding. Hence, if this sheet is used as a heat-shrinkable label which requires high shrinkable property at low-temperature, sufficient low-temperature shrinkable property cannot be obtained.

Patent Document 1: Japanese Patent Application Laid-Open (JP-A) No. 2003-205548
Patent Document 2: JP-A No. 2005-306587
Patent Document 3: JP-A No. 2005-68232
Patent Document 4: JP-A No. 5-179110
Patent Document 5: JP-A No. 9-316310
Patent Document 6: JP-A No. 2003-301077
Patent Document 7: JP-A No. 6-263892
Patent Document 8: JP-A No. 2002-19053

DISCLOSURE OF THE INVENTION

Problems to be Solved by the Invention

Accordingly, an object of the present invention is to provide a polyolefin series heat-shrinkable film, which exhibits excellent heat-shrinkable property and shrink finishing quality, and low natural shrinkage, and which is applicable to shrinkable packing, shrinkable bond-packing, shrinkable label, and the like.

Another object of the invention is to provide a molded product and a heat-shrinkable label employing the above film suitably used for shrinkable packing, shrinkable bond-packing, shrinkable label, and so on, and to provide a container on which the molded product or the heat-shrinkable label is fitted.

Means for Solving the Problems

The present inventors intensively studied the composition, mixing ratio, and process condition of polyolefin series resin, polylactic acid series resin, and a resin facilitating compatibility of these resins. As a result, the present inventors succeeded to obtain a heat-shrinkable film which can solve the problems of the conventional arts, and the present invention is thus completed.

In other words, the object of the present invention is achieved by a polyolefin series heat-shrinkable film comprising a mixed resin mainly containing a polyolefin series resin (A), a polylactic acid series resin (B), and a resin (C) facilitating compatibility with the resin (A) and the resin (B), or comprising at least one layer made of the mixed resin, wherein mass ratio of the resin (A) to the resin (B) is: (A)/(B)=99/1 to 70/30; heat shrinkage ratio of the film at least in one direction when dipped in hot water at 80° C. for 10 seconds is 20% or more; and natural shrinkage ratio of the film when stored at 40° C. under 50% RH environment for 7 days is less than 10%.

In the polyolefin series heat-shrinkable film (hereinafter, it may be referred to as "film of the invention".), the resin (C) is preferably at least one kind selected from a group consisting of following resin (c-1), resin (c-2), and resin (c-3).

Resin (c-1): copolymer of ethylene with at least one kind selected from a group consisting of vinyl acetate, (meth) acrylic acid, ethyl (meth) acrylate, methyl (meth) acrylate, maleic anhydride, and grycidyl (meth) acrylate;

Resin (c-2): modified polystyrene series resin;

Resin (c-3): modified polyolefin series resin.

In the above description, the term "(meth) acryl" contains meaning of both "acryl" and "methacryl"; for example, "(meth) acrylic acid" means both acrylic acid and methacrylic acid (same in this description below.).

In the film of the invention, content of the resin (C) is preferably 1 part by mass or more and 30 parts by mass or less to 100 parts by mass of a mixture of the resin (A) and the resin (B).

In the film of the invention, the resin (A) is preferably any one of polyethylene series resin, polypropylene series resin, ethylene-vinyl acetate copolymer, or a mixture thereof.

In the film of the invention, the resin (A) is preferably a mixed resin containing hydrocarbon resins.

In the film of the invention, a pair of surface-and-backside layers having the resin (B) as a main component can be placed on both sides of the mixed resin layer mainly containing the resin (A), the resin (B), and the resin (C).

Moreover, in the film of the invention, an adhesive layer consisting of an adhesive resin is preferably placed between the mixed resin layer and the pair of surface-and-backside layers.

Also, when the film of the invention is a laminate film, ratio of a total thickness of the pair of surface-and-backside layers to thickness of the whole film is 10% or more and 70% or less.

Another object of the present invention can be achieved by a molded product and a heat-shrinkable label employing the above films as the base material, together with a container on which the molded product or the heat-shrinkable label is fitted.

Effects of the Invention

According to the present invention, it is possible to provide a polyolefin series heat-shrinkable film which exhibits excellent heat-shrinkable property, shrink finishing quality, and low natural shrinkage.

In addition, according to the invention, it is possible to provide a molded product and a heat-shrinkable label, which exhibits excellent shrink finishing quality, has sufficient film rigidity, and inhibits natural shrinkage, and which is applicable to shrinkable packing, shrinkable bond-packing, and shrinkable label. Further, according to the invention, it is possible to provide a container to which the molded product or the heat-shrinkable label is fitted at a desired position no matter what kind of shape the fitting product is, and which has a clear-looking appearance without having any troubles such as occurrence of wrinkles, pocks, and insufficient shrinking.

BEST MODE FOR CARRYING OUT THE INVENTION

A film of the present invention, a molded product and a heat-shrinkable label employing the film of the invention, together with a container on which the molded product or the heat-shrinkable label is fitted (hereinafter, these may be referred to as "molded product of the invention", "label of the invention", and "container of the invention".) will be described in detail as follows.

In this description, the term "mainly containing" (or "as a main component") allows inclusion of other components unless inhibiting effect of resins which configure individual layers. Although, the term does not specifically limit the content rate; it is a component where 70 mass % or more, preferably 80 mass % or more, furthermore preferably 90 mass % or more, and 100 mass % or less to a total of constituent component in each layer. Moreover, in the description, the term "main shrinking direction" means a direction where heat shrinkage ratio is higher between film's longitudinal direction and width direction. For example, when fitted around a bottle, it is a direction equivalent to the circumferential direction of the bottle; on the other hand, the term "orthogonal direction" means a direction orthogonal to the main shrinking direction.

[Heat-Shrinkable Film]

A film of the present invention comprises a mixed resin mainly containing a polyolefin series resin (A), a polylactic acid series resin (B), and a resin (C) (hereinafter, the resin (C) may be abbreviated to "compatible resin (C)".) facilitating compatibility with the resin (A) and the resin (B), or comprises at least one layer made of the mixed resin.

<Polyolefin Series Resin (A)>

In the invention, the polyolefin series resin used as the resin (A) is not particularly limited to; in view of heat-shrinkable property, mechanical property, and formability, it is preferably any one of polyethylene series resin, polypropylene series resin, ethylene-vinyl acetate copolymer, or mixture thereof. The suitable examples of polyethylene series resin, polypropylene series resin, and ethylene-vinyl acetate copolymer respectively used in the invention will be shown as below.

As a suitably used polyethylene series resin in the invention, a high-density polyethylene resin (HDPE) of which density is 0.940 $g/cm^3$ or more and 0.970 $g/cm^3$ or less; a medium-density polyethylene resin (MDPE) of which density is 0.920 g/cm³ or more and 0.940 g/cm³ or less; a low-density polyethylene resin (LDPE) of which density is less than 0.920 g/cm³ or linear low-density polyethylene resin (LLDPE). Among these, in view of elongation property, film's impact resistance, transparency, and etc., particularly, linear low-density polyethylene resin (LLDPE) is suitably used.

Examples of the linear low-density polyethylene resin (LLDPE) include a copolymer of ethylene with α-olefin of carbon number 3 to 20, preferably carbon number 4 to 12. As the α-olefin, there may be propylene, 1-butene, 1-pentene, 1-hexene, 1-heptene, 1-octene, 1-nonene, 1-decene, 3-methyl-1-butene, 4-methyl-1-pentene, and so on. Among these, 1-butane, 1-hexane, and 1-octene are suitably used. Further, the copolymerizing α-olefin may be used alone or in combination of two or more thereof.

Density of the polyethylene series resin is desirably in the range of 0.800 g/cm³ or more, preferably 0.850 g/cm³ or more, more preferably 0.900 g/cm³ or more; and 0.945 g/cm³ or less, preferably 0.935 g/cm³ or less, and furthermore preferably 0.925 g/cm³ or less. If the density is 0.800 g/cm³ or more, film rigidity (stiffness at room temperature) of the entire film and heat resistance are not significantly lowered, thereby it is practically preferable. On the other hand, if the density is 0.945 g/cm³ or less, it is preferable because elongation property at low-temperature can be maintained and heat shrinkage ratio within the practical temperature scale (70° C. or more and 90° C. or less) can be sufficiently obtained.

In addition, melt flow rate (MFR) of the polyethylene series resin is not particularly limited to; normally, MFR (JIS K7210, temperature: 190° C., load: 21.18 N) is desirably within the range of 0.5 g/10 minutes or more, more preferably 1.0 g/10 minutes or more, and 15 g/10 minutes or less, preferably 10 g/10 minutes or less. So as to obtain a film having even thickness, MFR of the polyethylene series resin is preferably selected to be similar to a viscosity of polylactic acid series resin at melting point.

Next, as examples of the polypropylene series resin include: homo-propylene resin, random polypropylene resin, block-polypropylene resin, ethylene-propylene rubber, ethylene-butene rubber, and ethylene diene rubber. Among them, in view of elongation property, transparency, stiffness, and so on, specifically, random polypropylene resin is suitably used.

Examples of the random polypropylene resin include a copolymer of propylene with α-olefin of carbon number 2 to 20, preferably carbon number 4 to 12. As the α-olefin, there may be ethylene, 1-butene, 1-pentene, 1-hexene, 1-heptene, 1-octene, 1-nonene, 1-decene, and so on. In the invention, in view of elongation property, heat-shrinkable property, film's impact resistance, transparency, stiffness, and so on, as an α-olefin, a random polypropylene of which content rate of ethylene unit is 2 mass % or more and 10 mass % or less is suitably used. Further, the copolymerizing α-olefin may be used alone or in combination of two or more thereof.

Melt flow rate (MFR) of the polypropylene series resin is not particularly limited to; normally, MFR (JIS K7210, temperature: 230° C., load: 21.18 N) is desirably within the range of 0.5 g/10 minutes or more, preferably 1.0 g/10 minutes or more, and 15 g/10 minutes or less, preferably 10 g/10 minutes or less. So as to obtain a film having even thickness, MFR of the polypropylene series resin is preferably selected to be similar to a viscosity of polylactic acid series resin at melting point.

Next, as an ethylene-vinyl acetate copolymer, an ethylene-vinyl acetate copolymer, wherein content rate of an ethylene unit is 50 mass % or more, preferably 60 mass % or more, and 95 mass % or less, preferably 85 mass % or less, is desirably used. If content rate of the ethylene unit is 50 mass % or more, stiffness of the entire film can be favorably maintained, thus it is preferable. Meanwhile, if content rate of the ethylene unit is 95 mass % or less, rigidity (stiffness at room temperature) of the entire film and heat resistance are not significantly lowered; thereby it is practically preferable.

Melt flow rate (MFR) of the ethylene-vinyl acetate copolymer is not particularly limited to; normally, MFR (JIS K7210, temperature: 190° C., load: 21.18 N) is desirably within the range of 0.5 g/10 minutes or more, preferably 1.0 g/10 minutes or more, and 15 g/10 minutes or less, preferably 10 g/10 minutes or less. So as to obtain a film having even thickness, MFR of the ethylene-vinyl acetate copolymer is preferably selected to be similar to a viscosity of polylactic acid series resin at melting point.

Manufacturing method of the resin (A) is not particularly limited to; for instance, commonly known polymerization method using a commonly known catalyst for olefin polymerization (specifically a method using multisite catalyst represented by Ziegler-Natta Catalyst and a method using single site catalyst represented by metallocene series catalyst) such as slurry copolymerization, solution copolymerization, mass polymerization, and gas-phase polymerization; the example also includes mass polymerization using radical initiator.

When two kinds or more of polyolefin series resin are used as the resin (A), the mixing ratio is adequately determined by considering glass transition temperature (Tg), melting point, viscoelasticity, and etc. of the mixed resin. For example, when the resin (A) is a mixed resin of polyethylene resin and polypropylene resin, mixing ratio (a/b) of the polyethylene resin (a) and the polypropylene resin (b) is within the range of 90/10 to 10/90, it is preferably 80/20 to 20/80, furthermore preferably 70/30 to 30/70. Also, when using a mixed resin of the polypropylene resin (b) and the ethylene-vinyl acetate copolymer (c), mixing ratio (b/c) is within the range of 90/10 to 10/90, it is preferably 80/20 to 20/80, furthermore preferably 70/30 to 30/70.

In the invention, examples of polyolefin series resin include: as polyethylene series resin, commercially available commodities (commodity names) such as: "Novatec HD, LD, LL", "Carnel", "Tufiner A, P" (manufactured by Japan Polyethylene Corporation), "Suntec HD, LD" (manufactured by Asahi Kasei Chemicals Corporation), "HIZEX", "ULTZEX", "EVOLUE" (manufactured by Mitsui Chemicals Inc.), "UBE polyethylene", "UMERIT" (manufactured by Ube Industries, Ltd.), "NUC polyethylene", "NUC-FLX" (manufactured by Nippon Unicar Company Limited), "Engage" (manufactured by The Dow Chemical Company), can be used. Moreover, as polypropylene series resin, commercially available commodities may be: "Novatec PP", "WINTEC", "Tufiner XR" (manufactured by Japan Polypropylene Corporation), "Mitsui polypro" (manufactured by Mitsui Chemicals Inc.), "Sumitomo Noblen", "Tuf-selen", "Excellen EPX" (manufactured by Sumitomo Chemical Co., Ltd.), "IDEMITSU PP", "IDEMITSU TPO" (manufactured by Idemitsu Kosan Co., Ltd.), and "Adflex", "Adsyl" (manufactured by SunAllomer Ltd.), can be used. Further, as ethylene-vinyl acetate copolymer, commercially available commodities may be: "Evaflex" (manufactured by Du Pont-Mitsui Polychemicals Co., Ltd.), "Novatec EVA" (manufactured by Japan Polyethylene Corporation), can be used.

In the invention, the resin (A) may further include hydrocarbon resins. When the hydrocarbon resins are included in the polyolefin series resin, crystallization of the polyolefin series resin (for example, polyethylene series resin and polypropylene series resin) and so on are inhibited, film's transparency can be improved, and elongation property at low-temperature can be maintained; thereby improvement of the heat-shrinkable property is expected.

In the invention, the "hydrocarbon resins" means petroleum resins, terpene resin, rosin series resin, and the like. Examples of petroleum resins include alicyclic petroleum resin derived from cyclopentadiene or dimer thereof, or aromatic petroleum resin derived from $C_9$ component. Also, examples of terpene resin include terpene resin and terpene-phenol resin both derived from β-pinene. Further, as rosin series resin, rosin resin such as gum rosin, wood rosin, as well as esterified rosin resin modified by glycerin, pentaerythritol, and so on. The hydrocarbon resins are known to show favorable compatibility when mixed into the polyolefin series resin and so on; in view of color tone, thermal stability, and compatibility, hydrogenated derivatives may be preferably used. Hydrogenated petroleum resin and partially hydrogenated petroleum resin are most preferable.

Some of the above hydrocarbon resins have various softening point depending on the molecular mass; in the invention, a hydrocarbon resins of which softening point is 100° C. or more, preferably 110° C. or more, and 150° C. or less, preferably 140° C. or less, is suitably used. If the softening point is 100° C. or more, at a time of addition to the polyolefin series resin, the hydrocarbon resins do not breed onto the sheet surface; because of this, blocking and decline of mechanical strength is not caused. Thus, it is practically preferable. On the other hand, if softening point is 150° C. or less, compatibility with polyolefin series resin can be favorably maintained, the hydrocarbon resins do not breed onto the film surface over time, blocking and deterioration of transparency are not caused, thereby it is preferable.

Content of the above hydrocarbon resins, to total mass of the resin (A), is preferably 5 mass % or more, more preferably 8 mass % or more, furthermore preferably 10 mass % or more, and 50 mass % or less, preferably 40 mass % or less, and furthermore preferably 30 mass %. Here, when content of the hydrocarbon resins is 5 mass % or more, improvement of transparency and shrinkable property of the film is remarkable. Meanwhile, when it is 50 mass % or less, the hydrocarbon resins do not breed onto the film surface over time, thereby it is capable to avoid occurrence of problems such as easiness of blocking between neighboring films, and decline of impact-resistance. Thus, it is preferable.

Examples of the above hydrocarbon resins may be any one of commercially available products including: (commodity name) "Hilets", "Petrodin" (manufactured by Mitsui Chemicals Inc.), "Alcon" (manufactured by Arakawa Chemical Industries, Ltd.), "Clearon" (manufactured by Yasuhara Chemical Co., Ltd.), "I-MARV" (manufactured by Idemitsu Kosan Co., Ltd.), "ESCOREZ" (manufactured by TONEX CO., LTD.).

<Polylactic Acid Series Resin (B)>

Next, a polylactic acid series resin used as the resin (B) will be described. The polylactic acid series resin in the invention includes a homopolymer of D-lactic acid or L-lactic acid, copolymers of these two, or mixture thereof. More specifically, poly(D-lactic acid) of which structural unit is D-lactic acid, poly(L-lactic acid) of which structural unit is L-lactic acid, poly(DL-lactic acid) which is a copolymer of L-lactic acid and D-lactic acid, or mixture thereof.

When the polylactic acid series resin to be used in the invention is a mixture of D-lactic acid and L-lactic acid, mixing ratio of D-lactic acid to L-lactic acid is preferably: D-lactic acid/L-lactic acid=99.8/0.2 to 75/25; or D-lactic acid/L-lactic acid=0.2/99.8 to 25/75. It is more preferably D-lactic acid/L-lactic acid=99.5/0.5 to 80/20 or D-lactic acid/L-lactic acid=0.5/99.5 to 20/80. A polylactic acid consisting of D-lactic acid alone or L-lactic acid alone shows extremely high crystalline, high melting point, and tends to exhibit excellent heat resistance and mechanical property. However, when it is used as a heat-shrinkable film, usually, printing and bag-making process using solvent are adopted; so, in order to improve printability and solvent sealing, it is necessary to adequately lower the crystalline property of constituent material itself. Also, when the crystalline property is extremely high, orientational crystallization progresses at a time of elongation; shrinkable property thereof tends to decrease. As a consequence, mixing ratio of the polylactic acid series resin to be used in the invention is most preferably: D-lactic acid/L-lactic acid=99/1 to 85/15, or D-lactic acid/L-lactic acid=1/99 to 15/85.

In the invention, polylactic acid series resin may be used by mixing copolymers of D-lactic acid and L-lactic acid, each of which has different copolymerization ratio. In such a case, an averaged value of copolymerization ratio between D-lactic acid and L-lactic acid of a plurality of lactic acid series polymers may be prepared to be within the above range. Depending on the applications, by mixing two kinds or more of polylactic acid series resins of which copolymerization ratio between D-lactic acid and L-lactic acid is different, and preparing crystalline property, it is possible to make a balance between heat resistance and heat-shrinkable property.

Moreover, the polylactic acid series resin used in the invention may be a copolymer of lactic acid with α-hydroxycarboxylic acid, aliphatic diol, and aliphatic dicarboxylic acid. Here, examples of "α-hydroxycarboxylic acid" copolymerized with lactic acid series resin include: enantiomer of lactic acid (indicating D-lactic acid to L-lactic acid and L-lactic acid to D-lactic acid); two functional aliphatic hydroxycarboxylic acid such as glycolic acid, 3-hydroxybutyric acid, 4-hydroxybutyric acid, 2-hydroxy-n-butyric acid, 2-hydroxy-3, 3-dimethylbutyric acid, 2-hydroxy-3-methylbutyric acid, 2-methylbutyric acid, and 2-hydroxycaprolactone acid; and lactones such as caprolactone, butyllactone, and valerolactone. In addition, examples of aliphatic diol copolymerized by lactic acid series resin include: ethylene glycol, 1,4-butanediol, 1,4-cyclohexane dimethanol. Moreover, as an aliphatic dicarboxylic acid to be copolymerized, there may be succinic acid, adipic acid, suberic acid, sebacic acid, dodecanedioate and so on. Copolymerization ratio of a copolymer of lactic acid to α-hydroxycarboxylic acid, aliphatic diol, or aliphatic dicarboxylic acid is preferably within the range of lactic acid/(α-hydroxycarboxylic acid, aliphatic diol, or aliphatic dicarboxylic acid)=90/10 to 10/90, more preferably 80/20 to 20/80, furthermore preferably 30/70 to 70/30. If the copolymerization ratio is within the above range, it is capable to obtain a film of which property balance among stiffness, transparency, impact resistance, and so on is favorable.

The above polylactic acid series resin can be produced by commonly known polymerization method like condensation polymerization, and ring-opening polymerization. For instance, by condensation polymerization, D-lactic acid, L-lactic acid, or mixture thereof are directly dehydration-condensation polymerized so as to obtain a polylactic acid series resin having optional composition. On the other hand, by ring-opening polymerization, lactide which is a cyclic dimer of lactic acid is polymerized under existence of a predetermined catalyst by using modifier, if necessary, so as to obtain a polylactic acid series resin having optional composition. Example of the above lactide may be DL-lactide which is a dimer of L-lactic acid, by mixing and polymerizing these as needed, a polylactic acid series resin having optional composition and crystalline property can be obtained. Further, for the purpose of increase of molecular mass, a small amount of chain extender such as diisocyanate compound, diepoxy compound, anhydride, acid chloride may be used.

The mass-average molecular mass of the polylactic acid series resin is desirably 20,000 or more, preferably 40,000 or more, further preferably 60,000 or more, and 400,000 or less, preferably 350,000 or less, further preferably 300,000 or less. If mass-average molecular mass is 20,000 or more, adequate resin cohesion can be obtained; it is possible to inhibit shortage of film's strength of elongation and embrittlement. Meanwhile, if mass-average molecular mass is 400,000 or less, it is possible to lower the melt viscosity, therefore it is preferable in view of improvement of manufacturing and its productivity.

Commercially available product of the above polylactic acid series resin may include "Nature Works" (manufactured by Nature Works LLC) and "LACEA" (manufactured by Mitsui Chemicals Inc.).

In the invention, it is important to have a mass ratio of resin (A) to resin (B) ((A)/(B)) in the range of 99/1 to 70/30, more preferably 95/5 to 70/30, and furthermore preferably 90/10 to 70/30. By setting the content of resin (A) to be 70 mass % or more, it is capable to obtain a film which exhibits excellent impact resistance and shrink finishing quality. On the other hand, by adding 1 mass % or more of resin (B), it is capable to obtain a film which is excellent in heat-shrinkable property and low natural shrinkage.

<Compatible Resin (C)>

In the present invention, a compatible resin (C) mainly containing a resin which is compatible with the above resin (A) and resin (B) The compatible resin is not particularly limited to as long as it has a function to make the resin (A) and resin (B) compatible. It is preferably at least one kind of copolymer or resin selected from following resin (c-1), resin (c-2), and resin (c-3).

Resin (c-1): copolymer of ethylene with at least one kind selected from a group consisting of vinyl acetate, (meth) acrylic acid, ethyl (meth) acrylate, methyl (meth) acrylate, maleic anhydride, and grycidyl (meth) acrylate;

Resin (c-2): modified polystyrene series resin;

Resin (c-3): modified polyolefin series resin.

The resin (c-1) means a copolymer of ethylene with at least one kind selected from a group consisting of vinyl acetate, (meth) acrylic acid, ethyl (meth) acrylate, methyl (meth) acrylate, maleic anhydride, and grycidyl (meth) acrylate. Examples of resin (c-1) include ethylene-vinyl acetate copolymer, ethylene-acrylic acid copolymer, ethylene-(meth) acrylic acid copolymer, ethylene-ethyl (meth) acrylate copolymer, ethylene-vinyl acetate-maleic anhydride copolymer, ethylene-ethyl acrylate-maleic anhydride copolymer, ethylene-grycidyl (meth) acrylate copolymer, ethylene-vinyl acetate-grycidyl (meth) acrylate copolymer, ethylene-methyl (meth) acrylate-grycidyl(meth)acrylate copolymer, and so on. Among them, there may be ethylene-vinyl acetate-grycidyl (meth) acrylate copolymer, ethylene-methyl (meth) acrylate-grycidyl (meth) acrylate copolymer; particularly, ethylene-vinyl acetate-maleic anhydride ternary copolymer, ethylene-grycidyl (meth) acrylate copolymer, ethylene-vinyl acetate-grycidyl (meth) acrylate copolymer, ethylene-ethyl acrylate-grycidyl (meth) acrylate copolymer are suitably used.

In resin (c-1), content rate of the ethylene unit is desirably 50 mass % or more and 95 mass % or less, preferably 60 mass % or more and 85 mass % or less. If content rate of the ethylene unit is 50 mass % or more, it is capable to favorably maintain the film stiffness. On the other hand, if content rate of the ethylene unit is 95 mass % or less, compatibility with resin (A) and resin (B) can be sufficiently attained; thereby it is possible to obtain a film which exhibits excellent transparency and mechanical strength.

In the resin (c-1): for example, as ethylene-vinyl acetate-maleic anhydride tercopolymer, "Bondine" (manufactured by Sumitomo Chemical Co., Ltd.); as ethylene-grycidyl (meth) acrylate copolymer, ethylene-vinyl acetate-grycidyl (meth) acrylate copolymer, and ethylene-ethyl acrylate-grycidyl (meth) acrylate copolymer, "Bondfirst" (manufactured by Sumitomo Chemical Co., Ltd.) can be used as commercially available products.

The resin (c-2) will be described as follows.

In the invention, the modified polystyrene series resin indicates a resin, wherein a polar group is introduced in a copolymer of styrene series hydrocarbon and conjugated diene series hydrocarbon or the hydrogenated derivatives thereof. As styrene series hydrocarbon, for example, styrene is suitably used; styrene congener such as α-methyl styrene may also be used. In addition, examples of conjugated diene series hydrocarbon include 1,3-butadiene, 1,2-isoprene, 1,4-isoprene, and 1,3-pentadiene; the conjugated diene series hydrocarbon may be hydrogenated derivatives thereof. These may be used alone or in combination of two or more thereof.

Whereas, desirably, content rate of styrene series hydrocarbon in resin (c-2), to total mass of the copolymer, is 5 mass % or more, preferably 7 mass % or more, furthermore preferably 10 mass % or more, and 50 mass % or less, preferably 40 mass % or less, furthermore preferably 35 mass % or less. If content rate of styrene is 5 mass % or more, when styrene is added, it is capable to obtain favorable compatibility and to maintain film's transparency. On the other hand, if content rate of styrene is 50 mass % or less, it is capable to inhibit film's rupture.

Also, examples of polar group introduced in resin (c-2) include: anhydride group, carboxylic acid group, carboxylic acid ester group, carboxylic acid chloride group, carboxylic acid amide group, carboxylate group, sulfonic acid group, sulfonic acid ester group, sulfonic acid chloride group, sulfonic acid amide group, sulfonate group, epoxy group, amino group, imide group, oxazoline group, hydroxyl group, and so on. Typical examples of the copolymer of conjugated diene series hydrocarbon with styrene hydrocarbon in which polar group is introduced or the hydrogenated derivatives thereof include: maleic anhydride modified SEBS, maleic anhydride modified SEPS, epoxy modified SEBS, epoxy modified SEPS, and so on. Among them, epoxy modified SEBS can be suitably used. Here, degree of epoxidation is adequately determined based on a mixing ratio of the resin (A) and resin (B), and kinds of unmodified styrene series resin. Preferably, epoxy equivalent is 350 or more, preferably 450 or more, and 1000 or less, preferably 800 or less. These copolymers may be used alone or in combination of two or more thereof.

As the resin (c-2), commercially available products such as: (commodity name) "Tuftech M" (manufactured by Asahi Kasei Chemicals Corporation), "Epofriend" (manufactured by Daicel Chemical Industries, Ltd.), and "Dynaron" (manufactured by JSR Corporation) can be used.

The resin (c-3) will be described as follows.

The modified polyolefin series resin of the invention means a resin mainly containing a polyolefin modified by an unsaturated carboxylic acid, anhydride thereof, or silane series coupling agent. Examples of unsaturated carboxylic acid or anhydride thereof include: acrylic acid, methacrylic acid, maleic acid, maleic anhydride, citraconic acid, citraconic anhydride, itaconic acid, itaconic anhydride; or ester compound of monoepoxy compound of derivatives of the above unsaturated carboxylic acid or anhydride with the above acids; and reaction product of polymer having a group being reactive to these acids in the molecule with acids, and so on. Further, metal salt thereof may be used. Among them, maleic anhydride is more preferably used. These copolymers may be used alone or in combination of two or more thereof.

As a silane series coupling agent, there may be vinyl-trietoxy silane, metacroyloxy-trimetoxy silane, γ-metacroyloxy-propyltriacetyloxy silane, and so on.

In order to manufacture the modified-polyolefin series resin, for example, at a stage of polymerization, the above modified monomer may be copolymerized, or graft copolymerization of the above modified monomer can be carried out with a polymer once polymerized. As the modified polyolefin series resin, these modified monomer are used alone or in combination; the content rate is suitably in the range of 0.1 mass % or more, preferably 0.3 mass % or more, further preferably 0.5 mass % or more, and 5 mass % or less, preferably 4.5 mass % or less, furthermore preferably 4.0 mass % or less. Among these modified monomers, grafted resin is suitably used.

Suitable examples of the modified polyolefin series resin include: maleic anhydride-modified polypropylene resin, maleic anhydride-modified polyethylene resin, and maleic anhydride ethylene-vinyl acetate copolymer. Among these, maleic anhydride-modified ethylene-vinyl acetate copolymer is preferable.

As the resin (c-3), commercially available products such as: (commodity name) "Admer" (manufactured by Mitsui Chemicals, Inc.), "Modic" (manufactured by Mitsubishi Chemical Corporation), "Modiper A" (manufactured by Nihon Yushi Kabushiki Kaisha: present NOF CORPORATION) can be used.

When two or more resins are used as the compatible resin (C), in view of compatibility between polyolefin series resin (A) and polylactic acid series resin (B), transparency of mixed resin, viscoelasticity value, and so on, the mixing ratio can be adjusted. Examples of the mixed resin may be: maleic anhydride modified polypropylene and maleic anhydride modified polyethylene; ethylene-vinyl acetate copolymer and maleic anhydride modified ethylene-vinyl acetate copolymer.

Desirably, the mixing dosage of the compatible resin (C), to 100 parts by mass of a mixture of the resin (A) and resin (B), is 1 part by mass or more, preferably 2 parts by mass or more, more preferably 3 parts by mass or more, and 30 parts by mass or less, preferably 25 parts by mass or less, more preferably 20 parts by mass or less. If mixing dosage of the compatible resin (C) to 100 parts by mass of the mixture is 1 part by mass or more, excellent appearance and impact resistance can be imparted to the film. On the other hand, if content of the compatible resin (C) is set to 30 parts by mass or less, it is possible to keep stiffness of the film.

[Heat-Shrinkable Laminate Film]

The film of the present invention may be configured with: a middle layer which is made of a mixture of the polyolefin series resin (A), the polylactic acid series resin (B), and the compatible resin (C); and a pair of surface-and-backside layers mainly containing polylactic acid series resin (B) respectively placed on both sides of the middle layer. Placing the pair of surface-and-backside layers mainly containing the resin (B) makes it possible to obtain a film which exhibits excellent transparency, heat-shrinkable property, and low natural shrinkage.

When the surface-and-backside layers are placed, to the degree which does not damage shrinkable property and film's stiffness (rigidity), in order to improve film's impact resistance, it is preferable to add other rubber components other than polylactic acid series resin to the resin (B) constituting the surface-and-backside layers. This rubber component is not particularly limited to; unless it is a polylactic acid series resin, aliphatic polyester; aromatic-aliphatic polyester; a copolymer consisting of diol, dicarboxylic acid, and lactic acid series resin; core-shell structure rubber; and etc can be suitably used.

Examples of the above aliphatic polyester include: polyhydroxy carboxylic acid, aliphatic polyester obtained by condensation polymerization of aliphatic diol and aliphatic dicarboxylic acid; aliphatic polyester obtained by ring-opening polymerization of cyclic lactones; synthetic aliphatic polyester, and so on. Examples of the above hydroxycarboxylic acid may be: a homopolymer or copolymer of hydroxycarboxylic acid such as 3-hydroxybutyric acid, 4-hydroxybutyric acid, 2-hydroxy-n-butyric acid, 2-hydroxy-3,3-dimethyl butyric acid, 2-hydroxy-3-methyl butyric acid, 2-methyl lactic acid, and 2-hydroxycaprolactone.

As an aliphatic polyester obtained by condensation polymerization of aliphatic diol and aliphatic dicarboxylic acid, a polymer obtained by condensation of one kind or two or more kinds selected from below-described aliphatic diol and aliphatic dicarboxylic acid, or a polymer obtained as a desired polymer by jumping-up of molecular mass using isocyanate compound as needed are cited. Here, examples of aliphatic diol include: ethyleneglycol, propylene glycol, 1,4-butanediol, and 1,4-cyclohexane dimethanol; meanwhile, examples of aliphatic dicarboxylic acid include: succinic acid, adipic acid, suberic acid, sebacic acid, dodecanedioate, and so on.

As an aliphatic polyester obtained by ring-opening condensation of cyclic lactones, a ring-opened polymer derived from cyclic monomer such as ε-caprolactone, σ-valerolactone, and β-methyl-σ-valerolactone. In these cyclic monomers, it is not only one kind of monomer, but also two or more monomers may be selected for copolymerization.

Moreover, as synthetic aliphatic polyester, a copolymer of cyclic anhydride and oxiranes, for example, there may be copolymer of succinic anhydride with ethylene oxide, or copolymer with propionic oxide, and the like.

As a typical examples of aliphatic polyester other than these polylactic acid series resins, "Bionolle" (manufactured by SHOWA HIGHPOLYMER CO., LTD.) obtained by polymerizing succinic acid, 1,4-butanediol, and adipic acid can be commercially available. As another example obtained by ring-opening condensation of ε-caprolactone, "Cellgreen" (manufactured by DAICEL CHEMICAL INDUSTRIES, LTD.) can be commercially available.

Next, as an aromatic-aliphatic polyester, one of which crystalline property is lowered by introducing aromatic ring between aliphatic chains can be used. The aromatic-aliphatic polyester is, for instance, obtained by condensation of aromatic dicarboxylic acid, aliphatic dicarboxylic acid, and aliphatic diol.

Examples of the above aromatic dicarboxylic acid may be isophthalic acid, terephthalic acid, 2,6-naphthalene dicarboxylic acid, and so on; terephthalic acid is most preferably used. Further, examples of aliphatic dicarboxylic acid include succinic acid, adipic acid, suberic acid, sebacic acid, and dodecanedioate, and so on; adipic acid is most preferably used. Among aromatic dicarboxylic acid, aliphatic dicarboxylic acid, and aliphatic diol, two or more thereof may be used.

Typical examples of the aromatic aliphatic polyester are a copolymer of tetramethylene adipate and terephthalate, and a copolymer of polybutylene adipate and terephthalate. As the copolymer of tetramethylene adipate and terephthalate, "EasterBio" (manufactured by Eastman Chemical Company); also as the copolymer of polybutylene adipate and terephthalate, "Ecoflex" (manufactured by BASF Corporation), may be commercially available.

Structure of the copolymer having the polylactic acid series resin, diol, and dicarboxylic acid may be any one of random copolymer, block copolymer, and graft copolymer. However, in view of film's impact resistance and transparency, block copolymer or graft copolymer is preferable. A specific example of random copolymer may be "GS-Pla" (manufactured by Mitsubishi Chemical Corporation); also a specific example of block copolymer or graft copolymer may be "Plamate" (manufactured by DIC Corporation).

Manufacturing method for copolymer of polylactic acid series resin, diol, and dicarboxylic acid is not particularly limited to; there may be a method by ring-opening polymerization or ester exchange reaction of polyester or polyether polyol each having a structure which is made by dehydration condensation of diol and dicarboxylic acid with lactide. Alternatively, there may be a method by dehydration-deglycol condensation or ester exchange reaction of polyester or polyether polyol each having a structure which is made by dehydration condensation of diol and dicarboxylic acid with polylactic acid series resin.

The copolymer of polylactic acid series resin, diol, and dicarboxylic acid can be prepared to a predetermined molecular mass by using isocyanate compound and carboxylic acid anhydride. In view of workability and mechanical property, desirably, the mass-average molecular mass is 50,000 or more, preferably 100,000 or more, and 300,000 or less, preferably 250,000 or less.

Examples of core-shell structure rubber include: diene series core-shell type polymer such as (meth) acrylic acid-butadiene copolymer, acrylonitrile-butadiene-styrene copolymer; acrylic series core-shell type polymer such as (meth) acrylic acid-styrene acrylonitrile copolymer; and silicone series core-shell type copolymer such as silicone-(meth) acrylic acid-methyl (meth) acrylate copolymer, and silicone-(meth) acrylic acid-acrylonitrile-styrene copolymer. Among these, in view of favorable compatibility with polylactic acid series resin and favorable balance between film's impact resistance and transparency, silicone-(meth) acrylic acid-methyl (meth) acrylate copolymer is suitably used.

Specifically, "Metablen" (manufactured by MITSUBISHI RAYON CO., LTD.), "KaneAce" (manufactured by KANEKA CORPORATION) are commercially available.

Content of the above rubber component, to 100 parts by mass of polylactic acid series resin as a main component of the surface-and-backside layers, is 100 parts by mass or less, preferably 80 parts by mass or less, more preferably 70 parts by mass or less. Setting the content of the rubber component to 100 parts by mass or less makes it possible not to damage film's stiffness and transparency, and possible to obtain a film suitably used for heat-shrinkable label. Also, by setting the content of the rubber component to 10 parts by mass or more, preferably 15 parts by mass or more, more preferably 20 parts by mass or more, it is capable to attain favorable impact resistance to the film.

Further, for the purpose of improving film's transparency, the surface-and-backside layers may contain acrylic series resin. The "acrylic series resin" means a methyl methacrylate homopolymer or a copolymer of methyl methacrylate with other vinyl monomers. Examples of the vinyl monomer include: methacrylic acid esters such as ethyl methacrylate, butyl methacrylate, cyclohexyl methacrylate, phenyl methacrylate, benzyl methacrylate, methacrylic acid-2-ethylhexyl, and methacrylic acid-2-hydroxyethyl; acrylic acid esters such as methyl acrylate, ethyl acrylate, butyl acrylate, cyclohexyl acrylate, phenyl acrylate, benzyl acrylate, acrylic acid-2-ethylhexyl, and acrylic acid-2-hydroxyethyl; unsaturated acids such as methacrylic acid and acrylic acid; styrene, α-methyl styrene, acrylonitrile, methacrylonitrile, maleic anhydride, phenyl maleimide, and cyclohexyl maleimide. Moreover, the copolymer of methyl methacrylate with other vinyl monomers may further contain an elastomer component like (polybutadiene or butadiene)-butyl acrylate copolymer, poly (butyl acrylate) copolymer, or glutaric anhydride unit, and glutarimide unit. Among them, in view of stiffness and formability, poly-methyl methacrylate resin (PMMA) as a homopolymer of methyl methacrylate, and a copolymer comprising two or more selected from a group consisting of: methyl methacrylate, ethyl methacrylate, butyl methacrylate, methyl acrylate, ethyl acrylate, butyl acrylate, acrylic acid, and methacrylic acid, is suitably used.

Mass-average molecular mass of the above acrylic series resin is 20,000 or more, preferably 40,000 or more, more preferably 60,000 or more, the upper limit is 400,000 or less, preferably 350,000 or less, and more preferably 300,000 or less. If mass-average molecular mass is 20,000 or more, it is possible to inhibit shortage of film's strength of elongation and embrittlement. Meanwhile, if mass-average molecular mass is 400,000 or less, it is possible to lower the melt viscosity; in view of improvement of production and its productivity, it is preferable.

Commercially available products of the above acrylic series resin may be "Sumipex" (manufactured by Sumitomo Chemical Co., Ltd.), "Acrypet" (manufactured by MITSUBISHI RAYON CO., LTD.), "Parapet" (manufactured by KURARAY CO., LTD.), "Altuglas" (manufactured by ATOFINA JAPAN CO., LTD.), and "Delpet" (manufactured by Asahi Kasei Chemicals Corporation).

Content of the above acrylic series resin to polylactic acid series resin (B) is preferably within the range of: polylactic acid series resin (B)/acrylic series resin=95/5 to 50/50, in mass ratio. If content of the acrylic series resin in the surface-and-backside layers is 5 mass % or more to a total mass of polylactic acid series resin (B) and acrylic series resin, it is possible to sufficiently improve film's shrinkable property, shrink finishing quality, and transparency. On the other hand, if content of acrylic series resin to a total mass of both resin is 50 mass % or less, film's impact resistance is not significantly deteriorated; thereby, elongation property at low-temperature can be maintained, and heat shrinkage ratio in practical temperature scale (about 70 to 90° C.) can be sufficiently obtained. Accordingly, the above polylactic acid series resin (B) and acrylic series resin for surface-and-backside layers is preferably mixed within the range of: polylactic acid series resin (B)/acrylic series resin=90/10 to 60/40, in mass ratio.

In the film of the present invention, so as to improve adhesiveness between the middle layer comprising the mixed resin containing: resin (A); resin (B); and resin (C), and the surface-and-backside layers containing the resin (B) as a main component, further, adhesive layers may be provided. The resin constituting the adhesive layers is not particularly limited to as long as it attains adhesiveness; resins shown in the description about resin (C) can be suitably used as an adhesive resin.

When surface-and-backside layers and adhesive layers are provided in this invention, thickness ratio of each layer should be set in view of the above-mentioned effect, it is not particularly limited to. Thickness ratio of the surface-and-backside layers to a total thickness of the film is desirably 10% or more, preferably 15% or more, more preferably 20%, and 70% or less, preferably 60% or less, more preferably 50% or less.

Further, in view of function, thickness of the adhesive layer is desirably within the range of 0.5 µm or more, preferably 0.75 µm or more, more preferably 1 µm or more, and 6 µm or less, preferably 5 µm or less. If thickness ratio of each layer is within the above range, it is possible to obtain a heat-shrinkable laminate film which especially exhibits excellent heat-shrinkable property, transparency, and low natural shrinkage in well balance and which is applicable to shrinkable packing, shrinkable bond-packing, and shrinkable label.

In the film of the invention, in the range which does not significantly damage the effect of the invention, additives other than the above-mentioned component, to a total mass (100 parts by mass) of resin constituting each layer, may also be suitably added to one of the above one layers or two-or-more layers within the range of 0.001 parts by mass or more, preferably 0.005 parts by mass or more, more preferably 0.01 parts by mass or more, and 10 parts by mass or less, preferably 5 parts by mass or less, more preferably 1 part by mass or less. The examples of additive may be, in view of improvement and adjustment of formability, productivity and various properties of the heat-shrinkable film, a recycled resin obtained by trimming loss like heels of films, silica, talc, kaolin, inorganic particles like calcium carbonate, titanium oxide, pigment like carbon black, flame retardant, weatherability stabilizer, heat resistance stabilizer, antistatic additive, melt viscosity improver, cross-linker, lubricant, nucleating agent, plasticizer, anti-aging agent, and so on.

<Physical and Mechanical Properties>

The important point of the film of the present invention is that heat shrinkage ratio when the film is dipped in 80° C. hot water for 10 seconds is 20% or more at least in one direction.

This becomes an index for determining adaptabilitas of a film for shrinkable label of PET bottle taken in the heat-shrink process in relatively short time (about a few seconds to a dozen seconds). For example, necessary shrinkage ratio required by the heat-shrinkable film to be used for shrinkable label of PET bottles, depending on the shape of bottles, is in general 20% to 70%.

An industrially most popular heat shrink machine for labeling of PET bottles these days is the so-called "steam-shrinker" using steam as an heating medium for shrinkage process. The heat-shrinkable film, from the viewpoint of influence of heat to the object to be lapped, needs to be sufficiently heat-shrunk at a temperature as low as possible. Further, with high-speed labeling process in recent years, request for quick shrinkage at lower temperature is increasing. In view of an industrial productivity like this, if the film of which heat shrinkage ratio under the above condition is 20% or more, it is possible to make the film sufficiently adhere to the object to be lapped within the heat-shrink time; thus it is preferable. Therefore, heat shrinkage ratio when the film is dipped in 80° C. hot water for 10 seconds is, at least in one direction, normally in main shrinking direction, desirably 20% or more, preferably 30% or more, more preferably 40% or more; the upper limit desirably is 85% or less, preferably 80% or less, more preferably 75% or less.

In the film of the invention, in order to adjust heat shrinkage ratio when the film is dipped in 80° C. hot water for 10 seconds within the above range, it is preferable to adjust composition of resins as described in this invention and also to adjust elongation temperature within the below-described range. For instance, when heat shrinkage ratio is required to be raised, any one of the following measures can be used: raising composition ratio of resin (B) constituting the film; raising elongation magnification; lowering elongation temperature; and providing surface-and-backside layers mainly containing the resin (B).

Also, natural shrinkage ratio of the film of the invention is desirably low, it is important that natural shrinkage ratio of the film when stored at 40° C. under 50% RH environment for 7 days is less than 10%, preferably 8% or less, more preferably 6% or less, most preferably less than 3%. If natural shrinkage ratio under the above condition is less than 10%, even after a long-time storage, it can be stably lapped over containers and so on; hence, practically, problems are hardly caused.

In the film of the invention, in order to adjust the natural shrinkage ratio of the film when stored at 40° C. under 50% RH environment for 7 days within the above range, it is important to adjust composition of the resin in a manner as described in the invention; alternatively, it can be adjusted by changing the below-described elongation temperature or providing surface-and-backside layers. For example, if natural shrinkage ratio is required to be lowered, measures like: raising composition ratio of the resin (B) constituting the film, lowering elongation magnification, raising elongation temperature, and providing surface-and-backside mainly containing layers resin (B).

Impact resistance of the film of the invention is evaluated by rupture elongation. In tensile test under 0° C. environment, particularly for label application, degree of elongation in film's drawing (flow) direction (MD) is 100% or more, preferably 150% or more, more preferably 200% or more. If rupture elongation under 0° C. environment is 100% or more, problems like film breakage can be hardly seen at a time of printing and bag-making; thus it is preferable. Further, with speeding-up of printing and bag-making processes, tensions of the film increases; however, in such a circumstance, the film is hardy broken if it has rupture elongation of 100% or more. Thus it is preferable. The upper limit of the rupture elongation varies depending on the resin composition, in view of film's stiffness, it is desirably 1000% or less. In the film of the invention, so as to adjust the degree of elongation in the tensile test under 0° C. environment within the above range, it is preferable to constitute the resin composition in a manner as described in the invention, as a specific adjustment method, for instance, mixing ratio of the resin (B) constituting the film may be lowered.

The film of the invention can be produced by a commonly known method. Shape of the film may be either a planar shape or a tubular shape. From the viewpoint of the productivity (several sets can be obtained as products in a width direction of an original film) and capability of printing on an inner surface, flat shape is preferable. An example of a manufacturing method of the planar film is as follows: a plurality of extruders are used to melt resins; the melted resins are co-extruded from T-dies, cooling and solidifying with a chilled roll, roll-stretching in a longitudinal direction, and tenter-stretching in a crosswise direction in this order; then it is treated by annealing and followed by cooling, (followed by applying the corona treatment when printing is applied); and finally a desired film can be obtained by winding with a winder. Furthermore, a method, wherein a film produced by means of a tubular method is cut and opened into a planar shape, can be applied as well.

Elongation magnification for applications of a film to be shrunk in two directions such as overlapping application, is twice or more, preferably three times or more, and 10 times or less, preferably six times or less in the longitudinal direction; it is also twice or more, preferably three times or more, and 10 times or less, preferably six times or less in the crosswise direction. On the other hand, for applications of a film to be shrunk in mainly one direction such as application of heat-shrinkable label, the elongation magnification is desirably determined so as to make it practically within the magnification range of monoaxial elongation such as: twice or more and 10 times or less, preferably 4 times or more and 8 times or less in the direction equivalent to the main shrinking direction; meanwhile, it is the same magnification or more and twice or less (same magnification means a case that the film is not elongated), preferably 1.1 times or more and 1.5 times or less in the direction orthogonal to the main shrinking direction. The biaxially-elongated film elongated within the above elongation magnification does not show too high heat shrinkage ratio in the direction orthogonal to the main shrinking direction. It is also preferable to be able to inhibit a phenomena the so-called "longitudinal sink-mark phenomena" such that for example, when a film is used for a shrinkable label application, the film is heat-shrunk around a container even in the height direction.

Elongation temperature needs to be changed depending on the glass transition temperature of resins to be used and properties required for the heat-shrinkable film. Overall, it is controlled in the range of 50° C. or more, preferably 60° C. or more, and the upper limit is 130° C. or less, preferably 110° C. or less. Then, the elongated film, if necessary, for the purpose of reduction of natural shrinkage ratio and improvement of heat shrinkage property, is treated by thermal treatment and relaxation treatment at a temperature around 50° C. or more and 100° C. or less, then is quickly cooled within the time before the molecular orientation is loosening up, so as to obtain the heat-shrinkable laminated film.

In addition, if necessary, the film of the invention can be treated by surface-treatment and surface-processing such as corona discharge treatment, printing, coating, vapor deposition, further treated by bag-making process using various solvent and heat-sealing, and perforation-making process.

A film of the invention is provided for packaging application by processing from planar shape into cylindrical shape along the objects to be covered. In case of cylindrical containers such as PET bottles of which outer surface needs to be printed, necessary images are printed on one entire surface of a wide-width flat film wound by a roll, the printed film is cut into pieces of film having required width, then a piece of film is folded so as the printed surface thereof to become inner surface of the film, finally center seal (shape of sealed portion is the so-called "envelop seams") is made to complete the cylindrical shape. As a method of center sealing, there may be a method of adhesive bonding by organic solvent, a method by heat seal, a method by adhesive, and a method by impulse sealer. Among these, from the viewpoint of productivity and pleasing appearance, a method of adhesive bonding by organic solvent is suitably used.

[Molded Product, Heat-Shrinkable Label and Container]

Since the film of the invention exhibits excellent low-temperature shrinkage, shrink finishing quality, transparency, natural shrinkage and so on, its usage is not particularly limited to. If necessary, by forming printed layer, deposited layer and other functional layers, it can be suitably used for various molded articles such as bottles (blown bottles), trays, lunch boxes, containers for food of delicatessen, and containers for dairy products. Especially, when the film of the invention is used as heat-shrinkable labels for food containers (such as PET bottles for soft drinks or food, glass bottles, preferably PET bottles), the film is capable to adhere to the complex shapes (e.g., cylindrical column of which center is constricted, quadrangular prism, pentagonal prism, and hexagonal column respectively having corners, etc.) of containers; thus containers being fitted with labels or molded products of pleasing appearance without having wrinkles and pocks can be obtained.

The film of the invention exhibits excellent low-temperature shrinkage and shrink finishing quality. It is used as a material of heat-shrinkable label for plastic molded articles being deformed by heating at high temperatures, but also it is suitably used as materials of heat-shrinkable label for packaging (containers) using materials as constituent thereof, whose thermal expansion rate and water absorption rate are extremely different from those of the heat-shrinkable film of the invention, for example at least one kind of material selected from a group consisting of: metal, porcelain, glass, paper; polyolefin series resin such as polyethylene, polypropylene, and polybutene; polyester series resin such as polymethacrylate series resin, polycarbonate series resin, polyethylene terephthalate, and polybutylene terephthalate; and polyamide series resin, are used as the constituting materials.

Examples of materials constituting plastic molded articles to which the film of the invention can be applicable include not only the above resins, but also polystyrene, rubber-modified high-impact polystyrene (HIPS), styrene-butyl acrylate copolymer, styrene-acrylonitrile copolymer, styrene-maleic anhydride copolymer, acrylonitrile-butadien-styrene copolymer (ABS), methylmethacrylate-butadiene-styrene copolymer (MBS), polyvinyl chloride series resin, phenolic resin, urea resin, melamine resin, epoxy resin, unsaturated polyester resin, silicone resin, and so on. These plastic packaging may be a mixture of two or more kinds of resins or lamination thereof.

EXAMPLES

The present invention will be described with examples as follows.

Measurement values and evaluation criteria thereof shown in the examples are defined as follows. Here, a drawing (flow) direction of the laminated film is described as MD, and a direction orthogonal to MD is called as TD.

(1) Heat Shrinkage Ratio

An obtained film was cut into pieces each having a size of 100 mm in MD and 100 mm in TD, gauge lines at 100 mm intervals were marked in main shrinking direction (TD), and the pieces were respectively dipped in 80° C. hot-water bath for 10 seconds. Then, distance between the gauge lines (A) was measured after a dip in 23° C. cold-water for 30 seconds to calculate a shrinkage ratio based on the following formula (1).

$$\text{Heat shrinkage ratio (\%)} = 100 \times (100 - A)/100 \quad (1)$$

(2) Natural Shrinkage Ratio

A film was cut into pieces each having a size of 100 mm in MD and 1000 mm in TD, and left them in thermostatic bath at 40° C. under 50% RH environment for 7 days. Then, the shrinkage amount in the film's main shrinking direction (TD) to the original dimension before shrinkage was measured at room temperature (23° C.), the ratio thereof was calculated in % value, and it was evaluated in accordance with the following criteria.

⊚ (very good): natural shrinkage ratio is less than 6.0%;
○ (good): natural shrinkage ratio is 6.0% or more and less than 10.0%;
X (bad): natural shrinkage ratio is 10.0% or more.

(3) Rupture Elongation

In accordance with JIS K7127, rupture elongation of a No. 1 test-piece (a strip test-piece having a size of 200 mm in total length, 10 to 25 mm in width, 100 mm in distance between gauge lines, and 150 mm in distance between clips) in a direction (MD) orthogonal to the film's main shrinking direction was measured under the condition of temperature at 0° C., testing rate of 100 mm/min.

⊚ (very good): rupture elongation is 200% or more;
○ (good): rupture elongation is 100% or more and less than 200%
X (bad): rupture elongation is less than 100%

(4) Film's Appearance

The obtained appearance of film was evaluated in accordance with the following criteria.

⊚ (very good): almost no spot can be seen in the film, the appearance is good;
○ (good): film has a few spots, but it is practically no problem;
X (bad): spots in the film is unignorable, the appearance is significantly bad.

(5) Shrink Finishing Quality

A film on which grid spaced at 10 mm intervals was printed was cut into a size of 100 mm in MD and 298 mm in TD. Portions of 10 mm at both ends of the film in TD were overlapped each other and thermally adhered by heat-sealing machine so as to produce a cylindrical film. The cylindrical film was fitted around a cylindrical PET bottle whose capacity is 1.5 L, it was come through the steam-heating type shrinking tunnel of which length was 3.2 m (3 zones) within about 8 seconds without rotation. The atmospheric temperature in each zone of the tunnel was set within the range from 75° C. to 95° C. by adjusting the steam flow with flow control valve. After film lapping, it was evaluated based on the following criteria.

⊚ (very good): shrinkage is sufficient, and the fitted label has sufficient tightness;
○ (good): shrinkage is sufficient, but tightness of the fitted label is not sufficient;
X (bad): shrinkage is insufficient, and the fitted label is slacked.

Example 1

As shown in Table 1, a resin composition wherein 5 parts by mass of an ethylene-methacrylic acid-grycidyl methacrylate copolymer (commodity name: "Bondfirst 7M" manufactured by Sumitomo Chemical Co., Ltd. (hereinafter, abbreviated as "C-1".) was mixed to 100 parts by mass of a mixed resin composition consisting of 25 mass % of random polypropylene resin (commodity name: "Wintec WFX4T" manufactured by Japan Polyethylene Corporation, MFR 7.0 g/10 minutes (hereinafter, abbreviated as "A-1".)), 40 mass % of a polyethylene resin (commodity name: "Umerit 0540F" manufactured by Ube Industries, Ltd., MFR 4.0 g/10 minutes (hereinafter, abbreviated as "A-2".)), 15 mass % of a hydrogenated petroleum resin (commodity name: "Alcon P140" manufactured by Arakawa Chemical Industries, Ltd., (hereinafter, abbreviated as "A-3".)), and 20 mass % of a polylactic acid resin (commodity name: "Nature Works 4060D" (L-body: D-body=88:12) manufactured by Nature Works LLC (hereinafter, abbreviated as "B-1".)) was fed into the respective biaxial extruders manufactured by TOSHIBA MACHINE CO., LTD. and melt-mixed at the set temperature 200° C., and extruded from monolayer T-dies. The film was taken-over by castroll at 50° C., was cooled and solidified so as to obtain a non-elongated sheet of 300 mm in width and 200 μm in thickness. Then, by using film-tentering machine manufactured by KYOTO MACHINERY CO., LTD., the film was elongated to 5.0 times in crosswise monoaxial direction at preheat temperature of 80° C., thermal treatment was done at elongation temperature 80° C.; finally, a heat-shrinkable film in thickness of 40 μm was obtained.

Films evaluated as "⊚" in all evaluation items were determined as (⊚), films of which evaluation contains "○" were determined as (○), and films having at least one "X" were determined as (X) to complete a comprehensive evaluation. The evaluation results are shown in Table 2.

Example 2

As shown in Table 1, except for adding 10 parts by mass of ethylene-methacrylic acid copolymer (commodity name: "Elvaloy 1126AC" manufactured by Du Pont-Mitsui Polychemicals Co., Ltd, MFR 0.6 g/10 minutes (hereinafter, abbreviated as "C-2".)) to 100 parts by mass of a mixed resin consisting of 60 mass % of A-1, 25 mass % of A-3, 15 mass % of B-1; Example 2 was carried out in the same manner as Example 1 and a film was obtained. Evaluation results of the obtained film are shown in Table 2.

Example 3

As shown in Table 1, except for adding 30 parts by mass of ethylene-vinyl acetate copolymer (commodity name: "Evaflex EV45LX" manufactured by Du Pont-Mitsui Polychemicals Co., Ltd, ethylene content rate 55 mass %, MFR 2.5 g/10 minutes (hereinafter, abbreviated as "C-3".)) to 100 parts by mass of a mixed resin consisting of 20 mass % of A-1, 20 mass % of A-2, 35 mass % of ethylene-vinyl acetate copolymer (commodity name: "Evaflex EV560" manufactured by Du Pont-Mitsui Polychemicals Co., Ltd, ethylene content rate 86 mass %, MFR 3.5 g/10 minutes (hereinafter, abbreviated as "A-4".)), and 25 mass % of B-1; Example 3 was carried out in the same manner as Example 1 and a film was obtained. Evaluation results of the obtained film are shown in Table 2.

Example 4

As shown in Table 1, except for adding 10 parts by mass of modified styrene-series resin (commodity name: "Dynaron 8630P" manufactured by JSR Corporation (hereinafter, abbreviated as "C-4".)) to 100 parts by mass of a mixed resin consisting of 45 mass % of A-1, 20 mass % of A-2, 15 mass % of A-3, and 20 mass % of B-1 to obtain a resin composition to make a middle layer; and providing a mixed resin consisting of 50 mass % of B-1, 40 mass % of polylactic acid resin (commodity name: "Nature Works 4050D" (L-body/D-body=95/5) manufactured by Nature Works LLC (hereinafter, abbreviated as "B-2".)), 10 mass % of acrylic-silicone series rubber (commodity name: "Metablen S2001" manufactured by MITSUBISHI RAYON CO., LTD. (hereinafter, abbreviated as "E-1".)) as surface-and-backside layers on both sides of the middle layer and making it co-extrusively laminated with the middle layer using three-layer two-kind of T-die so as to obtain a non-elongated laminated sheet of which thickness ratio was: (surface-and-backside layer)/(middle layer)/(surface-and-backside layer)=30 μm: 140 μm: 30 μm; Example 4 was carried out in the same manner as Example 1 and a film was obtained. Evaluation results of the obtained film are shown in Table 2.

Example 5

As shown in Table 1, except for adding 25 parts by mass of a modified polyolefin resin (commodity name: "Modic-AP M545" manufactured by Mitsubishi Chemical Corporation (hereinafter, abbreviated as "C-5".)) to 100 parts by mass of a mixed resin consisting of 45 mass % of A-1, 50 mass % of A-4, and 5 mass % of B-1 to obtain a resin composition to make a middle layer; providing a mixed resin consisting of 80 mass % of B-1 and 20 mass % of E-1: as surface-and-backside layers, and a modified styrene series thermoplastic resin (commodity name: "Tuftech M1943" manufactured by Asahi Kasei Chemicals Corporation, styrene content rate 20 mass % (hereinafter, abbreviated as "D-1".)) as adhesive layers, and making them co-extrusively laminated using five-layer three-kind of T-die so as to obtain a non-elongated laminated sheet of which thickness ratio was: (surface-and-backside layer)/(adhesive layer)/(middle layer)/(adhesive layer)/(surface-and-backside layer)=30 µm/10 µm/120 µm/10 µm/30 µm; Example 5 was carried out in the same manner as Example 1 and a film was obtained. Evaluation results of the obtained film are shown in Table 2.

Example 6

As shown in Table 1, except for using the same layer used in Example 1 as a middle layer, and providing a mixed resin consisting of 70 mass % of B-1 and 30 mass % of B-2 as surface-and-backside layers as well as a modified polyolefin resin (commodity name: "Admer SE800" manufactured by Mitsui Chemicals Inc., MFR 4.4 g/10 minutes (hereinafter, abbreviated as "D-2".)) as adhesive layers, and making them co-extrusively laminated using five-layer three-kind of T-die so as to obtain a non-elongated laminated sheet of which thickness ratio was: (surface-and-backside layer)/(adhesive layer)/(middle layer)/(adhesive layer)/(surface-and-backside layer)=50 µm/10 µm/80 µm/10 µm/50 µm; Example 6 was carried out in the same manner as Example 1 and a film was obtained. Evaluation results of the obtained film are shown in Table 2.

Example 7

As shown in Table 1, except for using the same layer used in Example 6 as a middle layer, and providing a mixed resin consisting of B-1: 80 mass % and a methyl methacrylate resin (commodity name: "Sumipex LG21" manufactured by Sumitomo Chemical Co., Ltd. (hereinafter, abbreviated as "E-2".)): 20 mass % as surface-and-backside layers; Example 4 was carried out in the same manner as Example 6 and a film was obtained. Evaluation results of the obtained film are shown in Table 2.

Example 8

As shown in Table 1, except for changing the composition of the layer in Example 1 to 50 mass % of A-1, 30 mass % of A-4, mass % of B-1, and 5 parts by mass of C-1; Example 8 was carried out in the same manner as Example 1 and a film was obtained. Evaluation results of the obtained film are shown in Table 2.

Comparative Example 1

As shown in Table 1, except for changing the composition of the layer in Example 1 to 45 mass % of A-1, 40 mass % of A-2, and 15 mass % of A-3, and excluding resins (B) and (C); Comparative example 1 was carried out in the same manner as Example 1 and a film was obtained. Evaluation results of the obtained film are shown in Table 2.

Comparative Example 2

As shown in Table 1, except for adding 5 parts by mass of C-1 to 100 parts by mass of a mixed resin consisting of 10 mass % of A-1, 25 mass % of A-2, 15 mass % of A-3, and 50 mass % of B-1; Comparative example 2 was carried out in the same manner as Example 1 to obtain a heat-shrinkable film. However, thick spots in the sheet was large, thereby the sheet was broken when elongated.

Comparative Example 3

As shown in Table 1, except for changing the composition of the layer in Example 1 to 45 mass % of A-1, and excluding resin (B); Comparative example 3 was carried out in the same manner as Example 1 and a film was obtained. Evaluation results of the obtained film are shown in Table 2.

Comparative Example 4

As shown in Table 1, except for changing the composition of the layer in Example 1 to 35 mass % of A-1, 45 mass % of A-2, and 20 mass % of B-1, and excluding resin (C); Comparative example 4 was carried out in the same manner as Example 1 and a film was obtained. Evaluation results of the obtained film are shown in Table 2.

TABLE 1

| | | | Example | | | | | | | | Comparative example | | | |
|---|---|---|---|---|---|---|---|---|---|---|---|---|---|---|
| | | | 1 | 2 | 3 | 4 | 5 | 6 | 7 | 8 | 1 | 2 | 3 | 4 |
| Core layer | (mass %) | A-1 | 25 | 60 | 20 | 45 | 45 | 25 | 25 | 50 | 45 | 10 | 45 | 35 |
| | | A-2 | 40 | | | 20 | 20 | 40 | 40 | | 40 | 25 | 40 | 45 |
| | | A-3 | 15 | 25 | | 15 | | 15 | 15 | | 15 | 15 | 15 | |
| | | A-4 | | | 35 | | 50 | | | 30 | | | | |
| | | B-1 | 20 | 15 | 25 | 20 | 5 | 20 | 20 | 20 | | 50 | | 20 |
| | | B-2 | | | | | | | | | | | | |
| | (part by mass) | C-1 | 5 | | | | | 5 | 5 | 5 | | 5 | 5 | |
| | | C-2 | | 10 | | | | | | | | | | |
| | | C-3 | | | 30 | | | | | | | | | |
| | | C-4 | | | | 10 | | | | | | | | |
| | | C-5 | | | | | 25 | | | | | | | |
| Surface-backside layer (mass %) | | B-1 | | | | 50 | 80 | 70 | 80 | | | | | |
| | | B-2 | | | | 40 | | 30 | | | | | | |
| | | E-1 | | | | 10 | 20 | | | | | | | |
| | | E-2 | | | | | | | 20 | | | | | |
| Adhesive layer (mass %) | | D-1 | | | | | 100 | | | | | | | |
| | | D-2 | | | | | | 100 | 100 | | | | | |

TABLE 2

|  | Example | | | | | | | | Comparative example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| Heat shrinkage ratio (%) | 27 | 24 | 23 | 35 | 38 | 37 | 37 | 28 | 16 | Broken at a time of elongation | 17 | 24 |
| Natural shrinkage | ○ | ○ | ○ | ◎ | ◎ | ◎ | ◎ | ○ | x |  | x | ○ |
| Rupture elongation | ◎ | ○ | ◎ | ◎ | ◎ | ○ | ◎ | ◎ | ◎ |  | ◎ | ◎ |
| Film's appearance | ○ | ◎ | ○ | ○ | ◎ | ○ | ○ | ○ | ◎ |  | ◎ | x |
| shrink finishing quality | ○ | ○ | ○ | ◎ | ◎ | ◎ | ◎ | ◎ | x |  | x | ○ |
| Comprehensive evaluation | ○ | ○ | ○ | ○ | ◎ | ○ | ○ | ○ | x | x | x | x |

As seen from Tables 1 and 2, films of Examples 1 to 8 configured in the layers which meet the condition of the present invention exhibit excellent heat-shrinkable property, shrink finishing quality, and low natural shrinkage.

On the other hand, when films do not contain resin (B) and/or resin (C) (Comparative examples 1, 3 and 4), at least one of properties, i.e. films' appearance, heat-shrinkable property, shrink finishing quality, solvent-sealing property, or natural shrinkage, was inferior to that of the present invention. Moreover, when mass ratio of the resin (A) is less than 70 mass % (Comparative example 2), film was broken when elongated; thereby a heat-shrinkable film could not be obtained.

Consequently, it is understood that the film of the present invention is a heat-shrinkable film which exhibits excellent heat-shrinkable property, shrink finishing quality, and low natural shrinkage; and which is applicable to shrinkable packing, shrinkable bond-packing, heat-shrinkable label, and so on.

INDUSTRIAL APPLICABILITY

The film of the present invention exhibit excellent heat-shrinkable property, shrink finishing quality, and low natural shrinkage; so, it can be applicable to various shrinkable packing, shrinkable bond-packing, shrinkable label, and so on.

The invention claimed is:

1. A polyolefin series heat-shrinkable film comprising:
a mixed resin layer comprising a polyolefin series resin (A), a polylactic acid series resin (B), and a resin (C) facilitating compatibility with said polyolefin series resin (A) and said polylactic acid series resin (B),
wherein a mass ratio of the polyolefin series resin (A) to the polylactic acid series resin (B) is: (A)/(B)=99/1 to 70/30, and
a pair of surface-and-backside layers comprising the polylactic acid series resin (B) as a main component and a rubber component other than the polylactic acid series resin (B) placed on both sides of the mixed resin layer comprising the polyolefin series resin (A), the polylactic acid series resin (B), and the resin (C),
wherein
a heat shrinkage ratio of said film at least in one direction when dipped in hot water at 80° C. for 10 seconds is 20% or more,
a natural shrinkage ratio of said film when stored at 40° C. under 50% RH environment for 7 days is less than 10%.

2. The polyolefin series heat-shrinkable film according to claim 1, wherein said resin (C) comprises at least one selected from the group consisting of a resin (c-1), a resin (c-2), and a resin (c-3), where
the resin (c-1) is a copolymer of ethylene with at least one component selected from the group consisting of vinyl acetate, acrylic acid, methacrylic acid, ethyl acrylate, ethyl methacrylate, methyl acrylate, methyl methacrylate, maleic anhydride, glycidyl acrylate, and glycidyl methacrylate,
the resin (c-2) is a modified polystyrene series resin, and
the resin (c-3) is a modified polyolefin series resin.

3. The polyolefin series heat-shrinkable film according to claim 1, wherein the mixed resin layer comprises said resin (C) in an amount of 1 part by mass or more and 30 parts by mass or less to 100 parts by mass of a mixture of said polyolefin series resin (A) and said polylactic acid series resin (B).

4. The polyolefin series heat-shrinkable film according to claim 1, wherein said polyolefin series resin (A) comprises one selected from the group consisting of a polyethylene series resin, a polypropylene series resin, an ethylene-vinyl acetate copolymer, and a mixture thereof.

5. The polyolefin series heat-shrinkable film according to claim 1, wherein said polyolefin series resin (A) comprises a mixed resin comprising hydrocarbon resins.

6. The polyolefin series heat-shrinkable film according to claim 1, wherein an adhesive layer comprising an adhesive resin is placed between said mixed resin layer and said pair of surface-and-backside layers.

7. The polyolefin series heat-shrinkable film according to claim 1, wherein a ratio % of a total thickness of said pair of surface-and-backside layers to a thickness of the whole film is 10% or more and 70% or less.

8. A molded product comprising a base material comprising said polyolefin series heat-shrinkable film as defined in claim 1.

9. A heat-shrinkable label comprising a base material comprising said polyolefin series heat-shrinkable film as defined in claim 1.

10. A container comprising said molded product as defined in claim 8.

11. A container comprising said heat-shrinkable label as defined in claim 9.

* * * * *